United States Patent [19]

Stiles

[11] Patent Number: 5,781,733
[45] Date of Patent: Jul. 14, 1998

[54] APPARATUS AND METHOD FOR REDUNDANT WRITE REMOVAL

[75] Inventor: Ian J. Stiles, Salem, Utah

[73] Assignee: Novell, Inc., Provo, Utah

[21] Appl. No.: 687,526

[22] PCT Filed: Jun. 20, 1996

[86] PCT No.: PCT/US96/10612

§ 371 Date: Aug. 7, 1996

§ 102(e) Date: Aug. 7, 1996

[51] Int. Cl.[6] .......................... G01R 31/28; G06F 11/00
[52] U.S. Cl. ................. 395/200.45; 711/113; 711/119; 711/143; 711/147; 395/200.57; 395/200.62; 395/200.33
[58] Field of Search .................. 395/200.45, 500, 395/200.57, 200.62, 200.33

[56] References Cited

U.S. PATENT DOCUMENTS

| | | | |
|---|---|---|---|
| 4,858,111 | 8/1989 | Steps | 364/200 |
| 5,119,485 | 6/1992 | Ledbetter, Jr. et al. | 395/425 |
| 5,133,519 | 5/1992 | Johnson et al. | 395/600 |
| 5,155,824 | 10/1992 | Edenfield et al. | 395/425 |
| 5,283,868 | 2/1994 | Baker et al. | 395/200 |
| 5,377,338 | 12/1994 | Olson et al. | 395/425 |
| 5,408,644 | 4/1995 | Schneider et al. | 395/575 |
| 5,452,447 | 9/1995 | Nelson et al. | 395/650 |
| 5,542,066 | 7/1996 | Mattson et al. | 395/463 |
| 5,668,967 | 9/1997 | Olson et al. | 395/842 |

*Primary Examiner*—Frank J. Asta
*Assistant Examiner*—Ivan Pierce
*Attorney, Agent, or Firm*—Computer Law++

[57] ABSTRACT

A method and apparatus for combining writes and avoiding redundant writes are disclosed. Based on values such as overhead message size, largest message size, packet round trip time, cache block size, dirty cache region size and separation, channel throughput, and the identity of cached data values, a write region containing cached data is selected and (if non-empty) is written across the network. Depending on conditions, the selected write region includes either two dirty regions and an intervening clean region or only one dirty region. In the latter case, the other dirty region is flushed by a subsequent write operation. The goals of avoiding network congestion, updating the cache promptly, and utilizing available network bandwidth are balanced according to conditions in the cache and on the network.

28 Claims, 6 Drawing Sheets

APPARATUS AND METHOD FOR REDUNDANT WRITE REMOVAL

FIELD OF THE INVENTION

The present invention relates to data storage in computer networks, and more specifically to a method and apparatus for combining writes and avoiding redundant writes when flushing cached data across a network.

TECHNICAL BACKGROUND OF THE INVENTION

On a typical computer, the central processor is separated from a non-volatile data storage medium by a bus, network, or other communication channel. For instance, in many networks modified data must be transferred across a network link before it can be written on non-volatile storage such as a hard disk.

Personal computers and workstations are often linked in a computer network to promote the sharing of data, application programs, files, and other resources. Sharing is accomplished with the use of a network "server." The server is a processing unit dedicated to managing centralized resources, managing data, and sharing resources with the personal computers and workstations, which are referred to as "clients" of the server.

Unfortunately, communicating over a network can be time-consuming. In many client/server networks, the clients, the server, or both therefore retain copies of information in a local "cache" that is readily accessed. Cache memory is divided into regions known as "cache blocks." Blocks that have been written to but not yet copied to non-volatile storage are called "dirty" blocks.

A drawback of conventional systems is their performance of redundant write operations. In some cases, entire blocks are written across the network even though only a portion of the block was overwritten in cache. Thus, much "clean" data is unnecessarily transferred through one or more communication channels to the server's hard disk. Moreover, conventional systems assume that the data values stored in a cache block are changed whenever data is written to that cache block. In fact, the previously cached values do not always differ from the values written over them. As a result, the same data may be sent through the communication channel twice during consecutive writes, to be stored again at the same location on the server's disk. Such transfers add to network congestion without preserving new data.

Another drawback of conventional systems is their inefficient use of available network bandwidth. The relationship between network packet size, current round trip time, and numerous other factors varies with time. Under some conditions it is more efficient to send one large packet containing dirty data, and under other conditions it is more efficient to send two separate smaller packets. Conventional systems for flushing cached data to a server do not adequately reflect these factors.

Thus, it would be an advancement in the art to provide an apparatus and method for decreasing the quantity of redundant write operations in a computer network.

It would also be an advancement to provide such an apparatus and method which dynamically adjust to changing network conditions to use one larger packet or two smaller packets, as appropriate.

Such an apparatus and method for redundant write removal are disclosed and claimed herein.

BRIEF SUMMARY OF THE INVENTION

The present invention provides an apparatus and method for selecting cached data to write across a computer network from a client to a server. The client includes a client data cache, which may be either a conventional cache or a cache according to the '919 application. One method includes the computer-implemented step of determining a write-bridge size, in a manner set forth after use of the write-bridge is described.

Additional steps locate first and second dirty regions in the client data cache. The dirty regions are separated from one another by a clean region of a determinable size. The dirty regions may be defined in alternative ways according to the present invention. Under one definition, a byte of cache is dirty if it was overwritten after the most recent flushing of data stored at that location. Under an alternative definition, the byte is dirty only if it has been thus overwritten and if the new data differs in value from the data that was overwritten.

Based on the write-bridge size and the size of the clean region, a write region containing cached data is selected and "flushed" or written across the network from the client to the server. The selected write region includes the clean region and both dirty regions when the write-bridge size exceeds the size of the clean region. Otherwise the write region includes one of the dirty regions, and a second write region including the other dirty region is subsequently flushed.

The write-bridge size may be determined in various ways according to the present invention. For instance, the write-bridge may be set to twice an overhead message size; set to a largest single message size if packet round trip time is excessive; set to a predetermined minimum if throughput is low; set to the minimum of the largest message size and the cache block size; set to the largest message size less the sum of the sizes of two previously located dirty regions; or set to the product of throughput and round trip time.

According to some methods of the present invention, the decision whether to combine dirty regions in one write or to send them separately in two writes is based on conditions which involve one or more of the following: the largest single message size, the respective sizes of the dirty regions, the size of the clean region between the dirty regions, the throughput of the communication channel in bytes per second, and the round trip time in seconds.

Because the invention tends to limit writes to those that contain only dirty data, redundant writes are reduced or eliminated. However, the invention balances the goals of avoiding network congestion, updating the cache promptly, and utilizing available network bandwidth to reflect the inherent characteristics and current conditions of the cache and the network.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
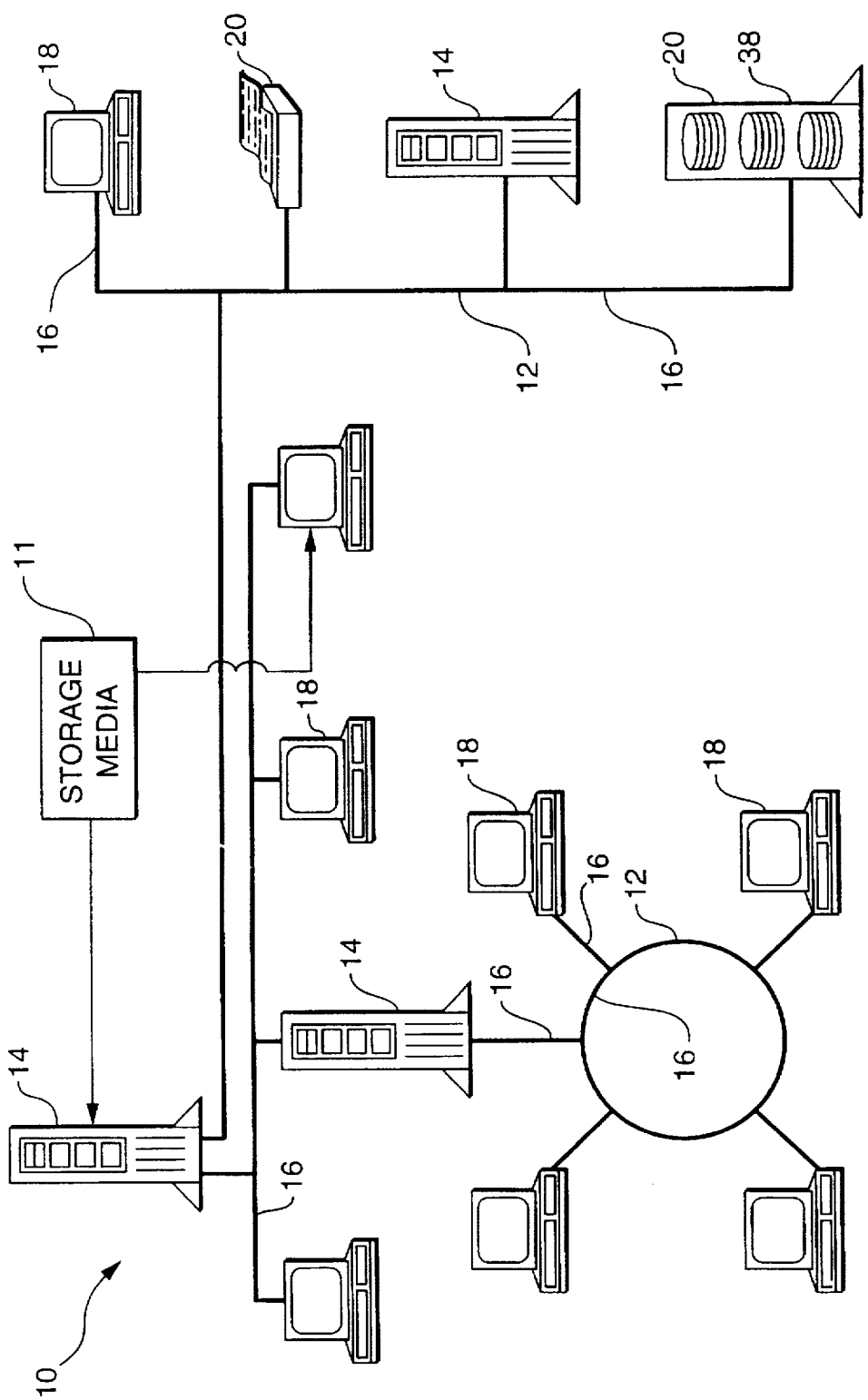
FIG. 1 is a schematic illustration of a computer network.

Reference is now made to the figures wherein like parts are referred to by like numerals. The present invention relates to a method and apparatus for removing redundant writes from the operations performed in a computer network. One of the many networks suited for use with the present invention is indicated generally at 10 in FIG. 1. In one embodiment, the network 10 includes Novell NetWare® software, version 4.x (NetWare is a registered trademark of Novell, Inc.). The illustrated network 10 includes several connected local networks 12. Each local network 12 includes a file server 14 connected by signal lines 16 to one or more clients 18 such as personal computers and workstations. A printer 20 and an array of disks 22 are also attached to the network 10. Although a particular network 10 is shown, those of skill in the art will recognize that the present invention is also useful in a variety of other networks.

Figure 2:
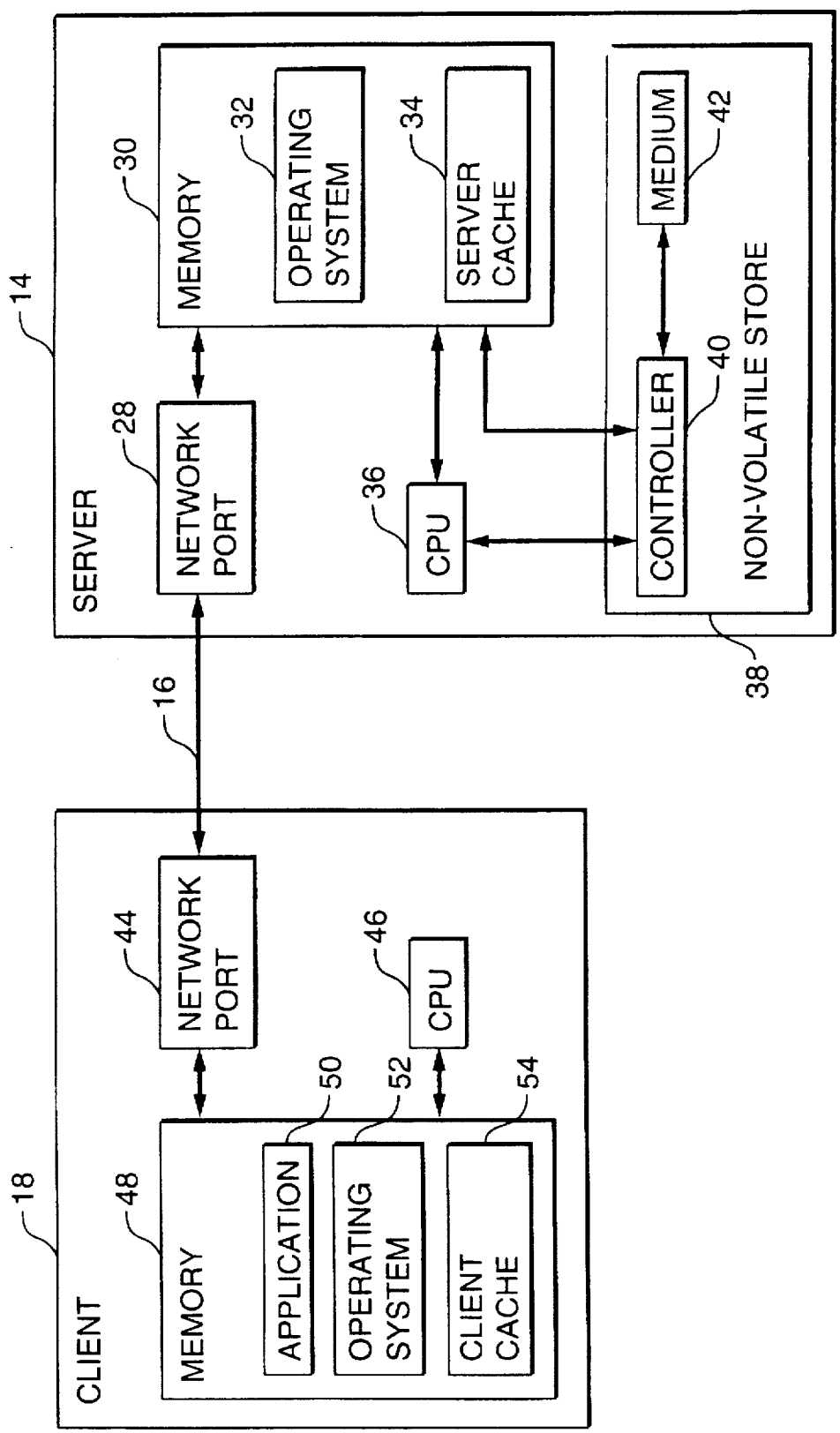
FIG. 2 is a diagram illustrating embodiments of a client computer and a server computer in the computer network according to the present invention.

One server 14 and one client 18 are further illustrated in FIG. 2. The server 14 includes a network port 28 which allows the server 14 to read packets from, and write packets to, the signal line 16 that carries packets between the server 14 and the client 18. The network port 28 includes hardware and software familiar to those in the art, and the packets are organized, transmitted, and interpreted in a manner that is readily determined by those of skill in the art.

The server 14 also includes a server memory 30 such as a random access memory ("RAM"). The server memory 30 is one example of a "data store," also known as a "computer-readable medium." Other familiar data stores include, without limitation, magnetic hard disks, magnetic floppy disks, optical disks, CD-ROM disks, and magnetic tape. Each such data store includes a substrate such as a magnetic material which is capable of storing data in physical form. According to the present invention, the substrate of the server memory 30 is given a specific physical configuration that causes the server 14 to operate in the manner taught herein. A first portion of the server memory 30 stores a server operating system 32. The server operating system 32 includes familiar operating system capabilities that are supplemented, modified, and/or replaced in a manner readily determined by those of skill in the art by the redundant write removal capabilities of the present invention.

A second portion of the server memory 30 stores a server cache 34. The server 14 also includes a central processing unit ("CPU") 36 and a non-volatile store 38. The non-volatile store 38 includes a controller 40 which is in control signal communication with the CPU 36 and in data transfer communication with the server cache 34. Thus, the CPU 36 is capable of sending read and write requests to the controller 40.

With continued reference to FIG. 2, the client 18 includes a network port 44, a CPU 46, and a client memory 48. Each of the CPUs 36, 46 must be capable of being controlled by software in a manner that makes the computers 14, 18 operate according to the present invention. Illustrative embodiments of suitable controlling software written in the C programming language are provided in the '563 application and the '919 application.

In one embodiment, the client memory 48 includes RAM which is configured in three portions to control operation of the client computer 18. A first portion of the client memory 48 stores an application program 50 such as a word processors or spreadsheets. A second portion of the client memory 48 stores a client operating system 52 which includes familiar operating system capabilities supplemented, modified, and/or replaced by the redundant write removal capabilities of the present invention. A third portion of the client memory 48 stores a client cache 54.

Figure 3:
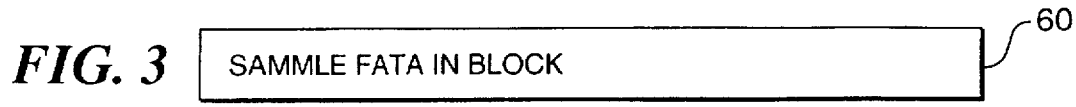
FIG. 3 is a diagram illustrating a cache block containing some text.

FIGS. 3 through 10 illustrate operation of the present invention. FIG. 3 shows a server cache data block 60. Although the present invention is illustrated in reducing write operations from the client 18 to the server 14, the invention may also be used to reduce redundant writes from the server 14 to the client 18 or redundant writes between different clients 18, as in a peer-to-peer network. Accordingly, the server cache data block 60 will be referred to hereafter simply as cache block 60. Likewise, the present invention is illustrated using English text in the cache block 60, but the invention may also-be used to reduce redundant writes of numeric or other types of data.

Figure 4:
FIG. 4 is a diagram illustrating text that will overwrite a portion of the cache block shown in FIG. 3.

FIG. 4 shows a first region 62 of text that will overwrite a portion of the cache block 60 shown in FIG. 3. To promote clarity of illustration, the region 62 is aligned in the drawings with the portion of the cache block 60 that will be overwritten. in practice, the region 62 is typically in a portion of the client memory 48 (FIG. 2) that is allocated to the application 50 or operating system 52 code that generated the data in the region 62.

Figure 5:
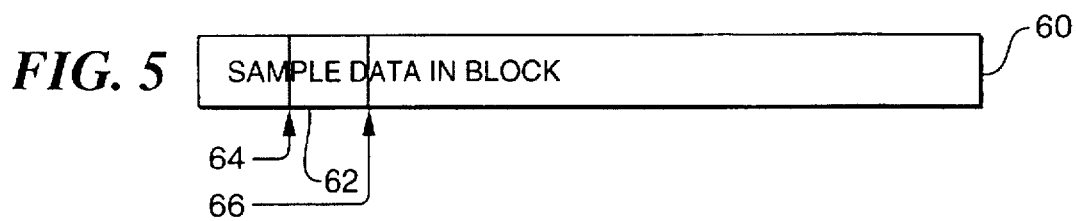
FIG. 5 is a diagram illustrating the cache block of FIG. 3 after entry of the text shown in FIG. 4.

FIG. 5 shows the cache block 60 after entry of the textual data in the region 62. The overwritten portion of the cache block 60 is defined by two boundaries 64, 66. The boundaries may be implemented as pointer or array index variables. In one embodiment, the boundary 64 is a variable named "DirtyStart" and the boundary 66 is a variable named "DirtyEnd". Those of skill in the art will appreciate that DirtyStart can point to the first dirty byte (holding the "p"), to the last clean byte (holding the "m"), or even to some other byte, provided only that the relationship between the value of DirtyStart and the first dirty byte is stable and understood and that suitable measures are taken to accommodate the boundaries of the cache block 60. Similar considerations apply to DirtyEnd.

Figure 6:
FIG. 6 is a diagram illustrating additional text that will overwrite a portion of the cache block shown in FIG. 5.

FIG. 6 shows a second region 68 of text that will overwrite another portion of the cache block 60. The remarks made above in connection with clarity of illustration in FIG. 4 also apply here.

Figure 7:
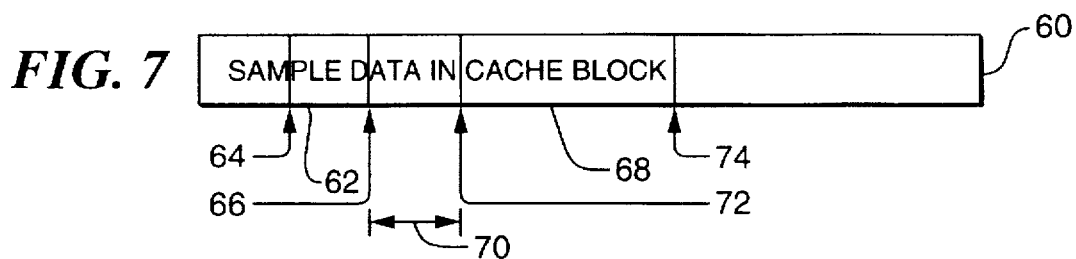
FIG. 7 is a diagram illustrating the cache block of FIG. 5 after entry of the text shown in FIG. 6 and indicating a gap between two dirty regions.

FIG. 7 shows the cache block 60 after entry of the textual data in the second region 68. A gap 70 is thus defined between the two dirty regions 62 and 68. As explained hereafter, the size of the gap 70 is used according to the present invention to determine whether the regions 62 and 68 should be flushed to the server 14 (FIG. 2) separately or together.

The second region 68 is defined by two boundaries 72, 74. Like the boundaries 64, 66 of the first region 62, the boundaries 72, 74 of the second region 68 may be implemented as pointer or array index variables and may point to the first dirty byte, to the last clean byte, or to some other byte, so long as the relationship between their values and the region 68 is stable and clear. In one embodiment, the boundary 72 is a variable named "NewDirtyStart" and the boundary 66 is a variable named "NewDirtyEnd".

Figure 8:
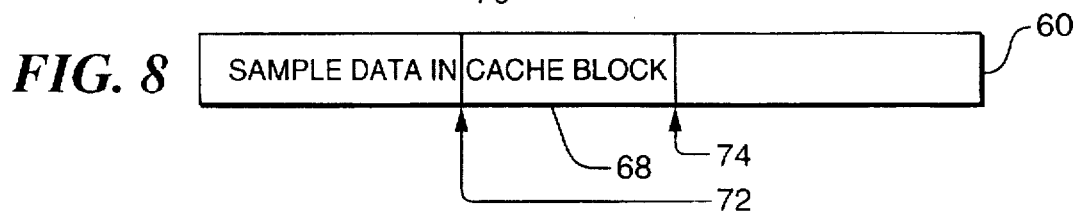
FIG. 8 is a diagram illustrating the cache block of FIG. 7 after a first dirty region is flushed.
Figure 9:
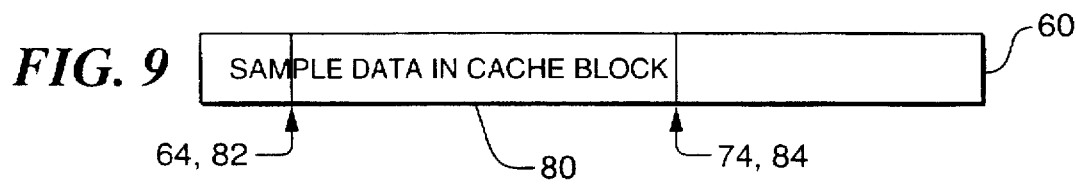
FIG. 9 is a diagram illustrating the cache block of FIG. 7 after two dirty regions are combined to form one larger dirty region.

FIGS. 8 and 9 illustrate alternative steps which are taken depending on the size of the gap 70 (FIG. 7). If the gap 70 is too large, it is more efficient to flush the regions 62 and 68 separately. FIG. 8 shows the cache block 60 after the first region 62 (FIG. 7) has been flushed. However, if the gap 70 is small enough, it is more efficient to combine the regions 62 and 68 into one larger dirty region as shown in FIG. 9. The combined region 80 is defined by a left boundary 82 that coincides with the leftmost boundary 64 of the first region 62 and a right boundary 84 that coincides with the rightmost boundary 74 of the second region 68. Like the other boundaries 64, 66, 72, and 74, the boundaries 82, 84 of the combined region 80 may be implemented in various ways as pointer or array index variables.

Figure 10:
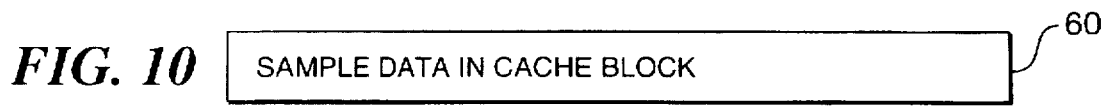
FIG. 10 is a diagram illustrating the result of flushing all dirty regions from the cache block of FIG. 7.

FIG. 10 shows the cache block 60 after all dirty regions are flushed. Depending on the size of the gap 70, one flushes the dirty regions 62 and 68 of FIG. 7 one at a time in separate write operations as illustrated in FIG. 8, or else one combines the two regions 62, 68 with the gap 70 to form a larger region 80 which is flushed in a single write operation.

Although the invention is illustrated in FIGS. 3-10 with two dirty regions that each lie within the same cache block, those of skill in the art will readily appreciate that the present invention also addresses similar situations in which two dirty regions lie partly or entirely within different cache blocks. However, the cache blocks involved must be contiguous; the highest address of one cache block must be adjacent the lowest address of the next. The gap between dirty regions may span one or more cache blocks, as may the dirty regions themselves.

Figure 11:
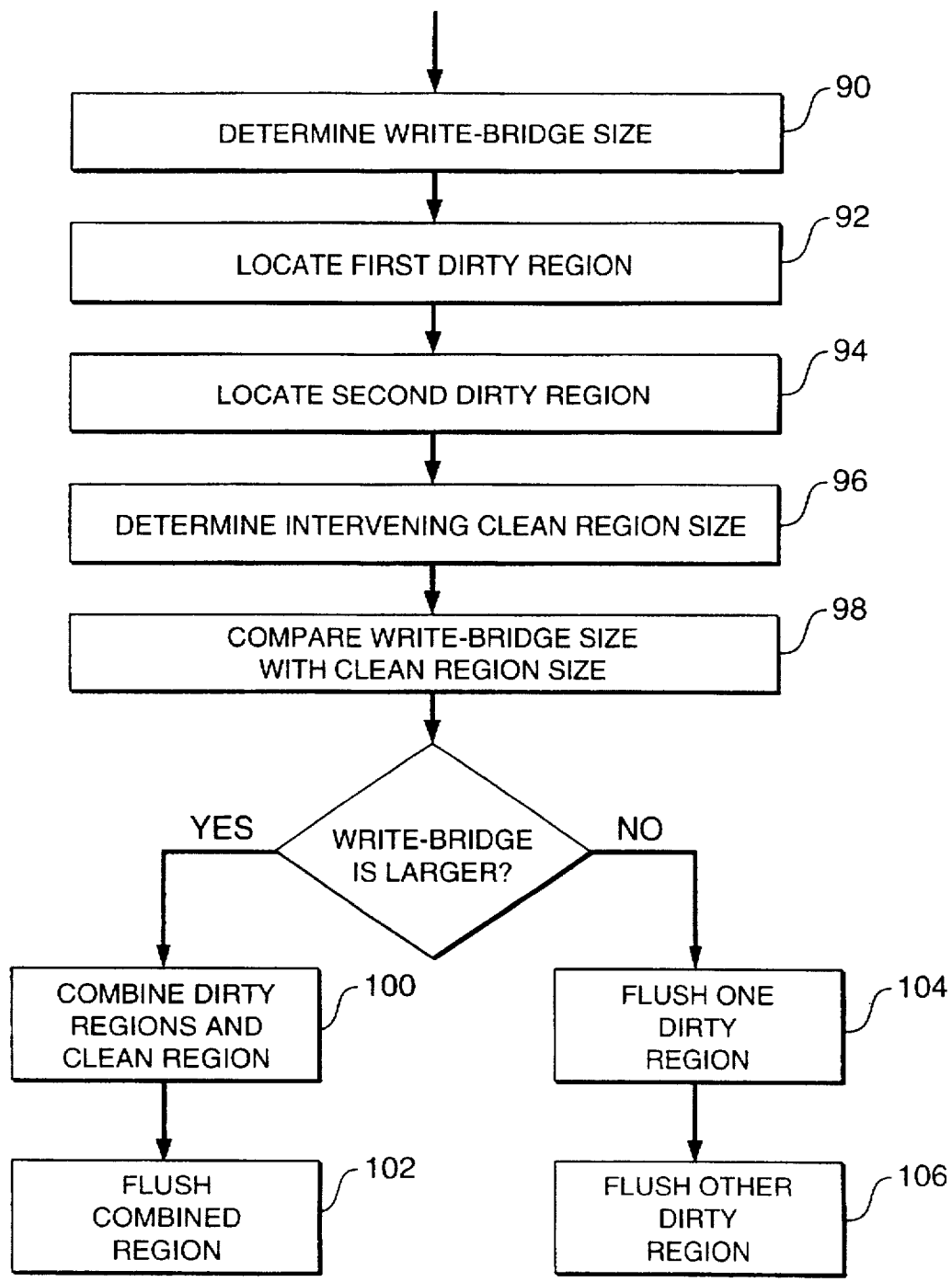
FIG. 11 is a diagram illustrating the method of flushing regions.
Figure 12:
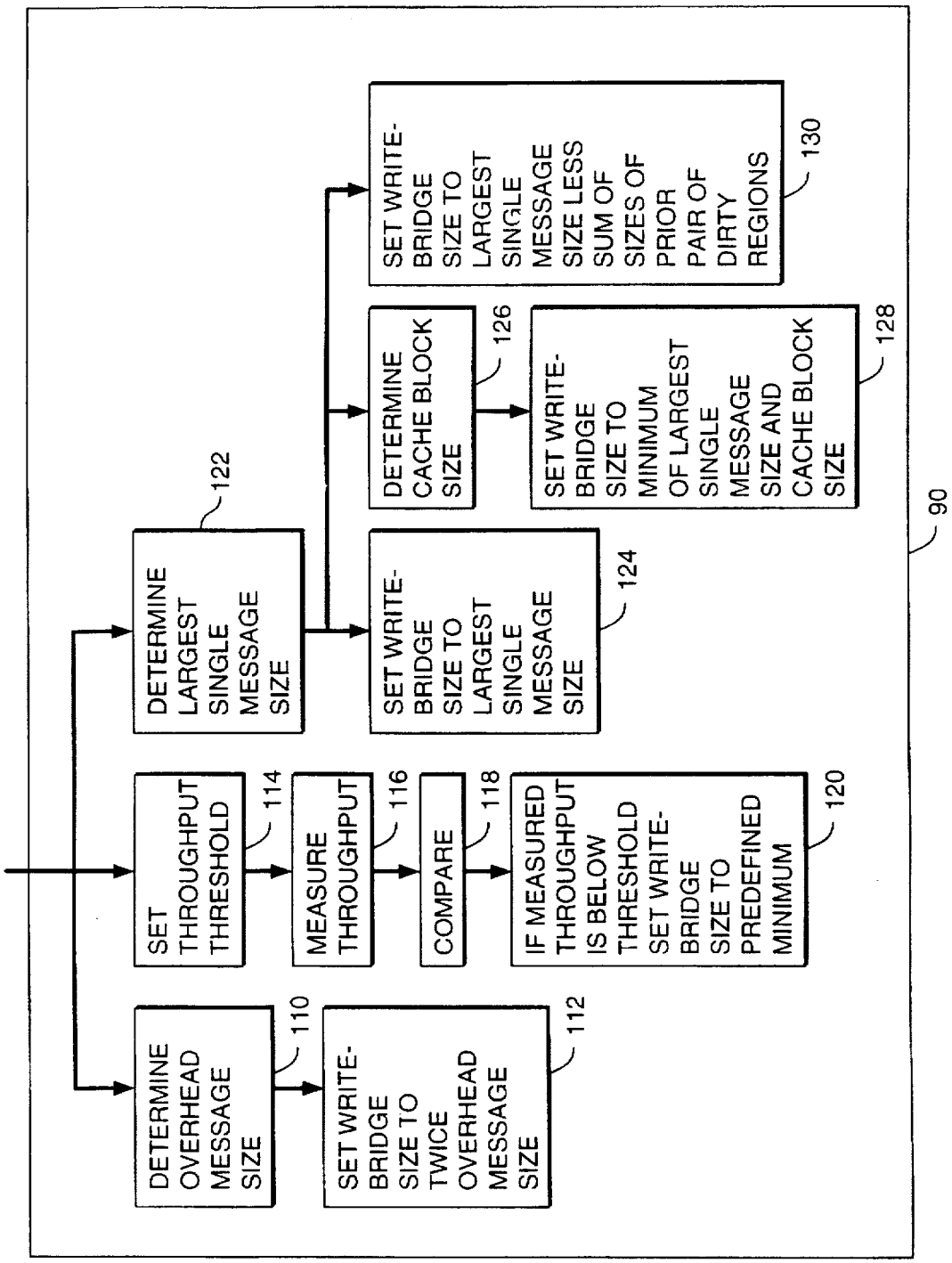
FIG. 12 is a diagram illustrating the method of setting ridge size.
Figure 13:
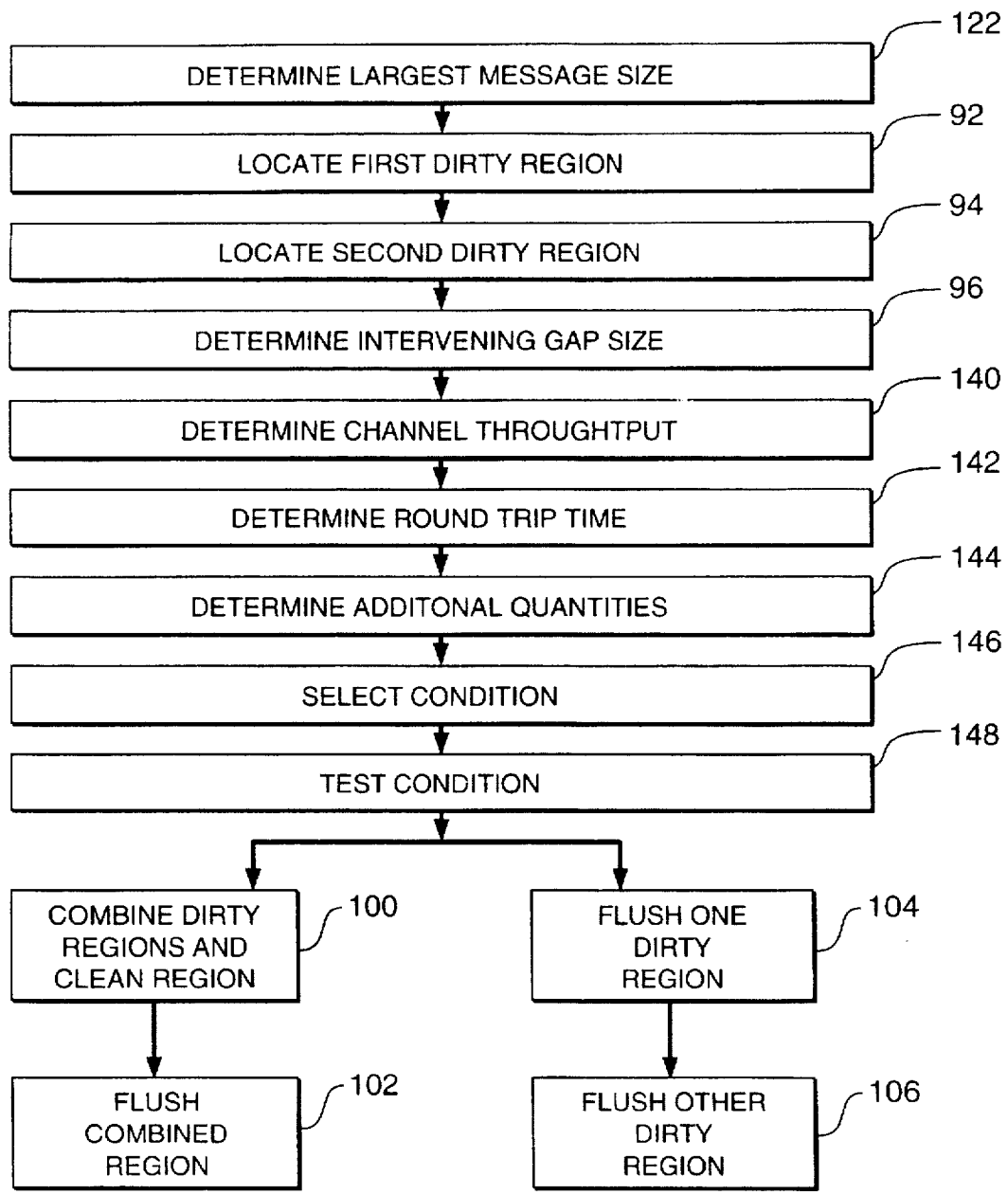
FIG. 13 is a diagram illustrating the alternative method of flushing regions.

FIGS. 11-13 further illustrate methods of the present invention generally, as well as particular steps for evaluating the size of a gap such as the gap 70 to determine whether dirty regions should be combined for one flush operation or flushed separately. The method shown in FIG. 11 includes a bridge size-determining step 90. During the step 90, the size of a write-bridge is determined. The write-bridge is so named because the decision between flushing the two dirty regions 62, 68 separately and flushing the single combiner dirty region 80 depends on whether the value determined during this step 90 bridges the gap 70. Steps for determining the write-bridge size, which are shown in FIG. 12, are discussed below.

FIG. 11 also shows a first region-locating step 92 and a second region-locating step 94. The step 92 includes locating the boundaries of a first dirty region such as the region 62 and setting boundary variables appropriately, such as in FIG. 5. The step 94 similarly includes locating the boundaries of a second dirty region such as the region 68 and setting boundary variables appropriately, such as in FIG. 8. In an alternative embodiment the steps 92 and 94 are performed in the opposite order.

During a gap size-determining step 96, the size of the clean region located between the dirty regions thus located is determined. This determination depends on the implementation used to set values for the boundary variables, as discussed in connection with FIGS. 5 and 7, but consists essentially of subtracting the value indicated by boundary 66 from that indicated by boundary 72.

During a subsequent comparing step 98, the write-bridge size determined during step 90 is compared with the gap size determined during step 96. If the write-bridge is larger, it spans the gap and the regions are combined with the intervening clean region, as illustrated in FIG. 9, and then flushed during a combining step 100 and a flushing step 102. Otherwise, the two regions are flushed separately during two steps 104, 106, and the intervening clean region is not flushed. FIG. 8 shows an example of the cache block 60 after the first flushing step 104 and before the second flushing step 106.

A variety of methods for carrying out the write-bridge size-determining step 90 are illustrated in FIG. 12. One method includes an overhead message size-determining step 110 followed by a magnifying bridge size setting step 112. The step 110 determines an overhead message size for the network 10 (FIG. 1). The overhead message size is the total size of all headers in the various protocols or network layers used to build a message. During the step 112, the write-bridge is set to the overhead message size magnified by a factor. The presently preferred factor is 2.0, but other suitable factors will be readily determined by those of skill in the art.

An alternative method for determining the write-bridge size includes a threshold-setting step 114, a throughput-measuring step 116, a comparing step 118, and a test-and-set step 120. Suitable throughput thresholds representing a lightly loaded network can be readily determined by those of skill in the art during the step 114 by looking at past performance of the network 10 and by iteratively repeating steps 90-106 and 114-120 with different threshold values.

The throughput-measuring step 116 may be omitted if network throughput is already know. Otherwise, throughput is measured by timing the transmission and receipt of a small message that is also echoed back. This measured time is divided into the difference in size of the two messages to produce a value representing throughput in bytes per second. The data in the echo message should be sufficiently random that network routers to prevent network routers from compressing the message, as that will give a false measure of the actual throughput.

The result of the threshold-setting step 114 is compared to the measured throughput during the comparing step 118 and acted upon during the test-and-set step 120. If the measured throughput is below the threshold, the write-bridge size is set to a predefined minimum value. This has the effect of favoring two separate region flushes over a single combined region flush because the write-bridge will tend not to span the gap 70 (FIG. 7). This increases the number of write operations but reduces the transfer of data that has already been flushed.

If the measured throughput is not below the threshold, the write-bridge size remains unchanged. The method of steps 114-120 can thus be used in combination with the method of steps 110-112. Indeed, the several methods illustrated in FIG. 12 are not mutually exclusive but may be combined for use at different times and/or in different communication channels within the same network 10.

Other alternative methods each include a LMS determining step 122. One alternative also includes a LMS-based setting step 124. A second alternative also includes a cache block sizing step 126 and a compare-and-set step 128. A third alternative also includes a reduced LMS-based setting step 130.

The LMS, or largest message size, of the network 10 (FIG. 1) is determined during the step 122 by considering a combination of the transport protocol and the network and datalink layers of the network 10, as viewed according to the OSI (Open Systems Interconnection) Reference Model. The LMS represents the actual amount of data that can be sent with a message and does not include the headers prepended or appended by the various protocols and layers. To put it another way, the LMS represents the amount of data that can be sent without waiting for an acknowledgement response packet.

With regard to the cache block sizing step 126, the cache block size is typically set by the network operating system 52 (FIG. 2) but may be configurable in some embodiments according to the present invention. The cache block size is normally a power of two so that calculations using the size can be performed using shift instructions instead of more expensive general-purpose multiply and divide instructions. Cache block sizes are optimal when their size is an integer multiple of the size of the physical medium's controller block size. For instance, disk sectors are often 512 bytes, so one suitable cache block size is eight times that, or 4096 byes. The smaller the cache block, the greater the chance of removing redundant write data because the clean region between two dirty regions is more likely to fill a cache block. The larger the cache block, the less overhead is needed for large sets of data.

FIG. 13 illustrates an alternative method of the present invention. The alternative method comprises the LMS determining step 122 (FIG. 12), the region-locating steps 92 and 94 (FIG. 11) and the gap size-determining step 96 (FIG. 11). A throughput-determining step 140 determines the current channel throughput ("BPS"), either by referencing a value placed in memory by a system administrator or by measuring the throughput as described above in connection with the step 116.

A round trip time measuring step 142 determines the round trip time. The round trip time ("RTT") of the communication channel is determined by timing the transmission and receipt of a small message that is echoed back.

An additional determining step 144 determines additional quantities as follows. A quantity "MT1" is the size in bytes of the first dirty region ("WD1") divided by the BPS plus RTT. A quantity "MT2" is the size in bytes of the second dirty region ("WD2") divided by the BPS plus RTT. A quantity "MTT" is MT1 plus MT2. Finally, a quantity "MS" is the sum of WD1, WD2, and the size in bytes of the intervening clean region ("GAP"), divided by BPS, plus RTT.

A condition selecting step 146 selects a test condition which depends on one or more of the following: WD1, WD2, GAP, LMS, BPS, RTT, MS, and MTT. A "WD1-WD2-GAP-LMS condition" holds if WD1 plus WD2 plus GAP exceeds LMS. An "MS-MTT condition" holds if MS is less than or equal to MTT.

The step 146 may also select a combination of such conditions and combine them to form a single more struc-tured condition. For instance, one combined condition comprises the WD1-WD2-GAP-LMS condition followed by the MS-MTT condition if the WD1-WD2-GAP-LMS condition does not hold.

A testing step 148 tests the condition selected during the step 146. If the condition holds, then the combining step 100 and the flushing step 102 are performed. Otherwise, the separate flushing steps 104 and 106 are performed.

The steps 122, 92–96, and 140–144 may be performed in other orders than those illustrated in FIG. 13, and steps which produce values not needed by the condition selected during the step 146 may be omitted. The methods illustrated in FIG. 13 may also be combined with those illustrated in FIGS. 11 and 12. For example, one approach sets the write-bridge size to twice the overhead message size; if the round trip time exceeds a predetermined value, the write-bridge size is then reset to the largest message size.

Several observations may be made about the write-bridge size and other values discussed above. First, larger message sizes indicate larger write-bridge sizes, because more data can fit before an acknowledgement packet from the server 14 (FIG. 1) is needed. Second, larger message sizes indicate larger write-bridge sizes, because it becomes more expensive to send two separate messages. Third, higher throughput indicates a larger write-bridge size, because more data can fit in a single request in a given time compared to the round trip time. Fourth, larger round trip times indicate larger write-bridge sizes, again because more data can fit in a single request in a given time compared to the round trip time.

Because determining the write-bridge size may involve echoing a large message, the step 90 (FIG. 11) should not be performed at connect time. Doing so would slow down the initial connection if the network 10 (FIG. 1) includes slow telephone line or satellite connections. Instead, the first large message request should be made as part of a normal request, such as a read request. If the write-bridge size is needed earlier, it may be initially set to the maximum packet size minus the size of the first write data minus the size of the second write data; if this is less than zero, the dirty regions are sent separately.

In summary, the present invention removes at least a portion of the redundant write operations that would otherwise occur in a computer network. Writes are considered redundant if they include byte values that have already been flushed from the client to the server. Redundancy is detected either by noting the boundaries of incoming regions or by comparing previous and newly overwritten byte values to detect differences. Redundancy is removed by flushing only the dirty regions in a cache block instead of sending the entire cache block.

Redundancy removal is selective, not arbitrary. The current conditions of the network, such as throughput and round trip time, as well as the underlying characteristics of the network, such as the largest message size, message overhead, and cache block size, are considered together with the size and location of specific dirty regions to determine whether it is more efficient to flush the dirty regions separately or to combine them with the intervening clean region and perform only one write.

Although particular apparatus and article embodiments of the present invention are expressly illustrated and described herein, it will be appreciated that additional and alternative apparatus and article embodiments may be formed according to methods of the present invention. Similarly, although particular method steps of the present invention are expressly described, those of skill in the art may readily determine additional and alternative steps in accordance with the apparatus and articles of the present invention. Unless otherwise expressly indicated, the description herein of methods of the present invention therefore extends to corresponding apparatus and articles, and the description of apparatus and articles of the present invention extends likewise to corresponding methods.

Section headings herein are for convenience only. The material under a given section heading is not necessarily the only material herein on that topic, nor is it necessarily limited only to material on that topic.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for selecting cached data to write across a computer network from a client to a server, the client including a client data cache, said method comprising the computer-implemented steps of:

determining a write-bridge size;

locating a first dirty region in the client data cache;

locating a second dirty region in the client data cache, the first dirty region and the second dirty region being separated by a clean region, the clean region defining a region separation size; and selecting a write region containing cached data to write across the network from the client to the server, the write region including the clean region and both dirty regions if the write-bridge size exceeds the region separation size, the write region otherwise excluding at least a portion of the clean region and also excluding at least a portion of one of the dirty regions.

2. The method of claim 1, wherein each of said locating steps comprises locating a dirty region that includes cached data which has replaced overwritten data that was previously stored at the same locations, and at least a portion of the cached data differs in value from the overwritten data.

3. The method of claim 1, wherein the write-bridge size determined by said determining step is about twice an overhead message size, the overhead message size being the total of all header sizes for headers added to data sent from the client to the server.

4. The method of claim 1, further comprising the steps of:

measuring packet round trip time; and comparing the measured round trip time with a predetermined value;

wherein the write-bridge size determined by said determining step equals a largest single message size if the round trip time exceeds the predetermined value.

5. The method of claim 1, wherein the write-bridge size determined by said determining step equals a predetermined minimum size if throughput from the client to the server is less than a predetermined threshold throughput.

6. The method of claim 1, wherein the write-bridge size determined by said determining step is about a largest single message size, the largest single message size representing the maximum amount of data, excluding headers, that can be sent in one message from the client to the server without waiting for an acknowledgement response from the server.

7. The method of claim 1, wherein the write-bridge size determined by said determining step is about the minimum of a largest message size and a cache block size.

8. The method of claim 1, wherein the write-bridge size determined by said determining step is about a largest message size minus the sum of the sizes of a previously located first dirty region and a previously located second dirty region.

9. The method of claim 1, further comprising the steps of:

determining a throughput of the communication channel in bytes per second, denoted by BPS; and determining a round trip time in seconds, denoted by RTT;

wherein the write-bridge size determined by said determining step is the product of BPS and RTT.

10. A method for selecting cached data to write across a computer network communication channel from a client to a server, the client including a client data cache, said method comprising the computer-implemented steps of:

determining a largest single message size, denoted hereafter by LMS;

locating a first dirty region in the client data cache, the first dirty region having a size in bytes denoted hereafter by WD1;

locating a second dirty region in the client data cache, the second dirty region having a size in bytes denoted hereafter by WD2, the first dirty region and the second dirty region being separated by a clean region, the clean region having a size in bytes denoted hereafter by GAP;

testing a condition based on at least LMS, WD1, WD2, and GAP; and selecting between at least two alternatives in response to said testing, a one-message alternative including sending one message which contains cached data from the clean region and both dirty regions, a two-message alternative including sending two messages, each of which contains cached data from one of the dirty regions and excludes cached data from the other dirty region and from the clean region.

11. The method of claim 10, wherein said testing step comprises testing a WD1-WD2-GAP-LMS condition which holds if WD1 plus WD2 plus GAP exceeds LMS, and said selecting step selects the two-message alternative if the WD1-WD2-GAP-LMS condition holds.

12. The method of claim 10, further comprising the computer-implemented steps of:

determining a throughput of the communication channel in bytes per second, denoted hereafter by BPS; and determining a round trip time in seconds, denoted hereafter by RTT;

wherein said testing step comprises testing a condition based on at least LMS, WD1, WD2, GAP, BPS, and RTT.

13. The method of claim 12, further comprising the computer-implemented steps of:

determining a quantity, denoted hereafter by MT1, which is equivalent to WD1 divided by BPS plus RTT;

determining a quantity, denoted hereafter by MT2, which is equivalent to WD2 divided by BPS plus RTT;

determining a quantity, denoted hereafter by MTT, which is equivalent to MT1 plus MT2;

determining a quantity, denoted hereafter by MS, which is equivalent to the sum of WD1, WD2, and GAP, divided by BPS, plus RTT;

wherein said testing step comprises testing an MS-MTT condition which holds if MS is less than or equal to MTT, and said selecting step selects the one-message alternative if the MS-MTT condition holds.

14. The method of claim 13, wherein a step of testing a WD1-WD2-GAP-LMS condition precedes said step of testing the MS-MTT condition, the WD1-WD2-GAP-LMS condition holds if WD1 plus WD2 plus GAP exceeds LMS, said selecting step selects the two-message alternative if the WD1-WD2-GAP-LMS condition holds, and said selecting step selects the two-message alternative if neither the WD1-WD2-GAP-LMS condition nor the MS-MTT condition holds.

15. A computer-readable medium encoded with a computer program to define structural and functional interrelationships between the computer program and the medium which permit realization of a method for selecting cached data to write across a computer network from a client to a server, the client including a client data cache, said method comprising the steps of:

determining a write-bridge size;

locating a first dirty region in the client data cache;

locating a second dirty region in the client data cache, the first dirty region and the second dirty region being separated by a clean region, the clean region defining a region separation size; and selecting a write region containing cached data to write across the network from the client to the server, the write region including the clean region and both dirty regions if the write-bridge size exceeds the region separation size, the write region otherwise excluding at least a portion of the clean region and also excluding at least a portion of one of the dirty regions.

16. The medium of claim 15, wherein each of said locating steps comprises locating a dirty region that includes cached data which has replaced overwritten data that was previously stored at the same locations and at least a portion of the cached data differs in value from the overwritten data.

17. The medium of claim 15, wherein the write-bridge size determined by said determining step is about twice an overhead message size, the overhead message size being the total of all header sizes for headers added to data sent from the client to the server.

18. The medium of claim 15, wherein said method further comprises the steps of:

measuring packet round trip time; and comparing the measured round trip time with a predetermined value;

wherein the write-bridge size determined by said determining step equals a largest single message size if the round trip time exceeds the predetermined value.

19. The medium of claim 15, wherein the write-bridge size determined by said determining step equals a predetermined minimum size if throughput from the client to the server is less than a predetermined threshold throughput.

20. The medium of claim 15, wherein the write-bridge size determined by said determining step is about a largest single message size, the largest single message size representing the maximum amount of data, excluding headers, that can be sent in one message from the client to the server without waiting for an acknowledgement response from the server.

21. The medium of claim 15, wherein the write-bridge size determined by said determining step is about the minimum of a largest message size and a cache block size.

22. The medium of claim 15, wherein the write-bridge size determined by said determining step is about a largest message size minus the sum of the sizes of a previously located first dirty region and a previously located second dirty region.

23. The medium of claim 15, wherein said method further comprises the steps of:

determining a throughput of the communication channel in bytes per second, denoted by BPS; and determining a round trip time in seconds, denoted by RTT; wherein the write-bridge size determined by said determining step is the product of BPS and RTT.

24. A computer system comprising:

a client computer having a client data cache, a client processor, and a client memory encoded with a client portion of a computer program;

a server computer connected to said client computer by a network communications link, said server computer having a server processor and also having a server memory encoded with a server portion of said computer program;

said client memory and said server memory encoded with said computer program to define structural and functional interrelationships between said computer program and said memories which permit realization of a method for selecting cached data to write across said network link, said method comprising the steps of:

determining a largest single message size, denoted hereafter by LMS;

locating a first dirty region in said client data cache, said first dirty region having a size in bytes denoted hereafter by WD1;

locating a second dirty region in said client data cache, said second dirty region having a size in bytes denoted hereafter by WD2, said first dirty region and said second dirty region being separated by a clean region, said clean region having a size in bytes denoted hereafter by GAP;

testing a condition based on at least LMS, WD1, WD2, and GAP; and selecting between at least two alternatives in response to said testing, a one-message alternative including sending one message which contains cached data from said clean region and both dirty regions, a two-message alternative including sending two messages, each of which contains cached data from one of said dirty regions and excludes cached data from said other dirty region and from said clean region.

25. The system of claim 24, wherein said testing step comprises testing a WD1-WD2-GAP-LMS condition which holds if WD1 plus WD2 plus GAP exceeds LMS, and said selecting step selects the two-message alternative if the WD1-WD2-GAP-LMS condition holds.

26. The system of claim 24, wherein said method further comprises the steps of:

determining a throughput of the communication channel in bytes per second, denoted hereafter by BPS; and determining a round trip time in seconds, denoted hereafter by RTT;

wherein said testing step comprises testing a condition based on at least LMS, WD1, WD2, GAP, BPS, and RTT.

27. The system of claim 26, wherein said method further comprises the steps of:

determining a quantity, denoted hereafter by MT1, which is equivalent to WD1 divided by BPS plus RTT;

determining a quantity, denoted hereafter by MT2, which is equivalent to WD2 divided by BPS plus RTT;

determining a quantity, denoted hereafter by MTT, which is equivalent to MT1 plus MT2;

determining a quantity, denoted hereafter by MS, which is equivalent to the sum of WD1, WD2, and GAP, divided by BPS, plus RTT;

wherein said testing step comprises testing an MS-MTT condition which holds if MS is less than or equal to MTT, and said selecting step selects the one-message alternative if the MS-MTT condition holds.

28. The system of claim 27, wherein a step of testing a WD1-WD2-GAP-LMS condition precedes said step of testing the MS-MTT condition, the WD1-WD2-GAP-LMS condition holds if WD1 plus WD2 plus GAP exceeds LMS, said selecting step selects the two-message alternative if the WD1-WD2-GAP-LMS condition holds, and said selecting step selects the two-message alternative if neither the WD1-WD2-GAP-LMS condition nor the MS-MTT condition holds.

* * * * *